US010774782B2

(12) United States Patent
Svensson

(10) Patent No.: US 10,774,782 B2
(45) Date of Patent: Sep. 15, 2020

(54) PISTON DESIGN FOR FLOW RE-DIRECTION

(71) Applicant: Caterpillar Inc., Deerfield, IL (US)

(72) Inventor: Kenth I. Svensson, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 107 days.

(21) Appl. No.: 16/002,711

(22) Filed: Jun. 7, 2018

(65) Prior Publication Data

US 2019/0376466 A1 Dec. 12, 2019

(51) Int. Cl.
*F02F 3/26* (2006.01)
*F02B 23/06* (2006.01)

(52) U.S. Cl.
CPC .......... *F02F 3/26* (2013.01); *F02B 23/0669* (2013.01); *F02B 23/0687* (2013.01)

(58) Field of Classification Search
CPC ...... F02F 3/26; F02B 23/0669; F02B 23/0687
USPC ........................................................ 123/301
See application file for complete search history.

(56) References Cited

U.S. PATENT DOCUMENTS

| 5,215,052 | A | 6/1993 | Augustin | |
|---|---|---|---|---|
| 6,443,122 | B1* | 9/2002 | Denbratt | F02B 23/104 |
| | | | | 123/276 |
| 8,459,229 | B2 | 6/2013 | Rothbauer | |
| 8,499,735 | B2 | 8/2013 | Eismark et al. | |
| 8,646,428 | B2 | 2/2014 | Eismark et al. | |
| 9,476,381 | B2* | 10/2016 | Bowing | F02B 23/0621 |
| 2011/0253095 | A1* | 10/2011 | Rothbauer | F02B 23/0651 |
| | | | | 123/276 |
| 2015/0308371 | A1* | 10/2015 | Eismark | F02F 3/0015 |
| | | | | 123/193.6 |
| 2020/0141305 | A1* | 5/2020 | Dembinski | F02B 23/0651 |

FOREIGN PATENT DOCUMENTS

| EP | 3176402 A1 | 6/2017 |
|---|---|---|
| EP | 3176403 A1 | 6/2017 |

* cited by examiner

*Primary Examiner* — Joseph J Dallo
*Assistant Examiner* — Yi-Kai Wang
(74) *Attorney, Agent, or Firm* — Hibshman Claim Construction PLLC

(57) ABSTRACT

A piston for an internal combustion engine includes a crown portion having a bowl that includes a plurality of protrusions. Each of the plurality of protrusions includes a first side surface and a second side surface, the first side surface having a generally concave shape, the second side surface having a generally flat or convex shape.

15 Claims, 3 Drawing Sheets

PISTON DESIGN FOR FLOW RE-DIRECTION

TECHNICAL FIELD

This patent disclosure relates generally to internal combustion engines and, more particularly, to combustion chamber features for direct-injection engines.

BACKGROUND

Most modern engines are direct-injection engines, which means that each combustion cylinder of the engine includes a dedicated fuel injector configured to inject fuel directly into a combustion chamber. While direct-injection engines represent an improvement in engine technology over past designs, in the form of increased engine efficiency and reduced emissions, the improvement of the design of any particular engine is always desirable, especially in light of increasing fuel costs and ever more strict regulations on engine emissions.

In a traditional direct-injection engine, one or more fuel jets that are injected into a combustion chamber interact with various combustion chamber structures, which cause the fuel to disperse into the combustion chamber. More specifically, the fuel jet(s) entering the combustion chamber impact various surfaces of the combustion chamber such as a piston bowl, the flame deck surface of the cylinder head, the cylinder liner or bore, and other surfaces before spreading in all directions. The impingement of the fuel jets with these structures may have a variety of effects including increased emissions because localized areas having higher fuel concentrations may burn rich, while other areas on the cylinder may burn lean. Following interaction with the various internal surfaces of the cylinder, the fuel jets and resulting flames may also interact with neighboring fuel jets or flames. These interactions can further result in higher temperatures, decreased fuel efficiency, increased heat rejection and component temperatures, and the like.

Various solutions have been proposed in the past for improving an engine's efficiency and reducing its emissions. One example of a previously proposed solution can be seen in U.S. Pat. No. 8,646,428 ("Eismark"), which was granted on Feb. 11, 2014. Eismark describes a piston having a crown in which protrusions having a smooth form are adapted for preserving kinetic energy in a flame plume. The piston is designed to be used in an engine in which quiescent air is provided in the engine cylinder. The fuel injector, forms fuel jets or flames that impinge on features formed in the piston bowl to redirect portions of the flames upward, towards a cylinder head surface, and the remaining portions of the flames in a tangential direction, within the bowl, to achieve better mixing of the combustion gases and decrease or eliminate stagnation zones in a combustion chamber.

While the flow redirection of Eismark may be partially effective in improving burning of fuel in an engine cylinder, it is configured to operate with a quiescent cylinder, which is difficult to attain for each cylinder consistently. In a typical engine, the momentum of intake air into an engine cylinder will possess at least some swirl, which following fuel injection into the cylinder will cause the flames that develop to be carried by the swirling air to one side and generally towards the cylinder wall.

SUMMARY

The disclosure describes, in one aspect, an internal combustion engine. The internal combustion engine includes an engine block having at least one cylinder bore, a cylinder head having a flame deck surface disposed at one end of the cylinder bore, an air intake valve associated with the cylinder head and configured to open and allow a flow of air, which may also include other fluids such as recirculated exhaust gas, a gaseous fuel and the like into the cylinder bore, and a piston connected to a rotatable crankshaft and configured to reciprocate within the cylinder bore. The piston has a crown portion facing the flame deck surface such that a combustion chamber is defined within the cylinder bore and between a top surface of the crown portion and the flame deck surface. The crown portion includes a bowl having a generally concave shape and extending within the crown portion and a wall, the wall extending peripherally around the piston. A fuel injector has a nozzle tip disposed in fluid communication with the combustion chamber. The nozzle tip has a plurality of nozzle orifices or openings configured to inject a plurality of fuel jets into the combustion chamber, each of the plurality of fuel jets being provided along a respective fuel jet centerline.

In one embodiment, a plurality of protrusions is disposed in the bowl adjacent the wall. Each of the plurality of protrusions includes a first side surface and a second side surface, the first side surface having a generally concave shape, the second side surface having a generally flat or convex shape. During operation of the engine, a swirling air mass provided into the combustion chamber through the air intake valve is mixed with a counter-swirling mass of burning air and fuel that has been provided through the fuel injector. The expanding flame counters the swirling air such that the flame is directed towards a center of the combustion chamber where additional oxygen is present to promote an efficient burning of fuel in the cylinder.

In another aspect, the disclosure describes a piston for an internal combustion engine. The piston includes a piston body, a crown portion extending below a top surface of the piston body, the crown portion including a bowl having a generally concave shape and extending within the crown portion and a wall, the wall extending peripherally around the piston body, and a plurality of protrusions disposed in the bowl adjacent the wall, each of the plurality of protrusions including a first side surface and a second side surface, the first side surface having a generally concave shape, the second side surface having a generally flat or convex shape.

DETAILED DESCRIPTION

Figure 1:
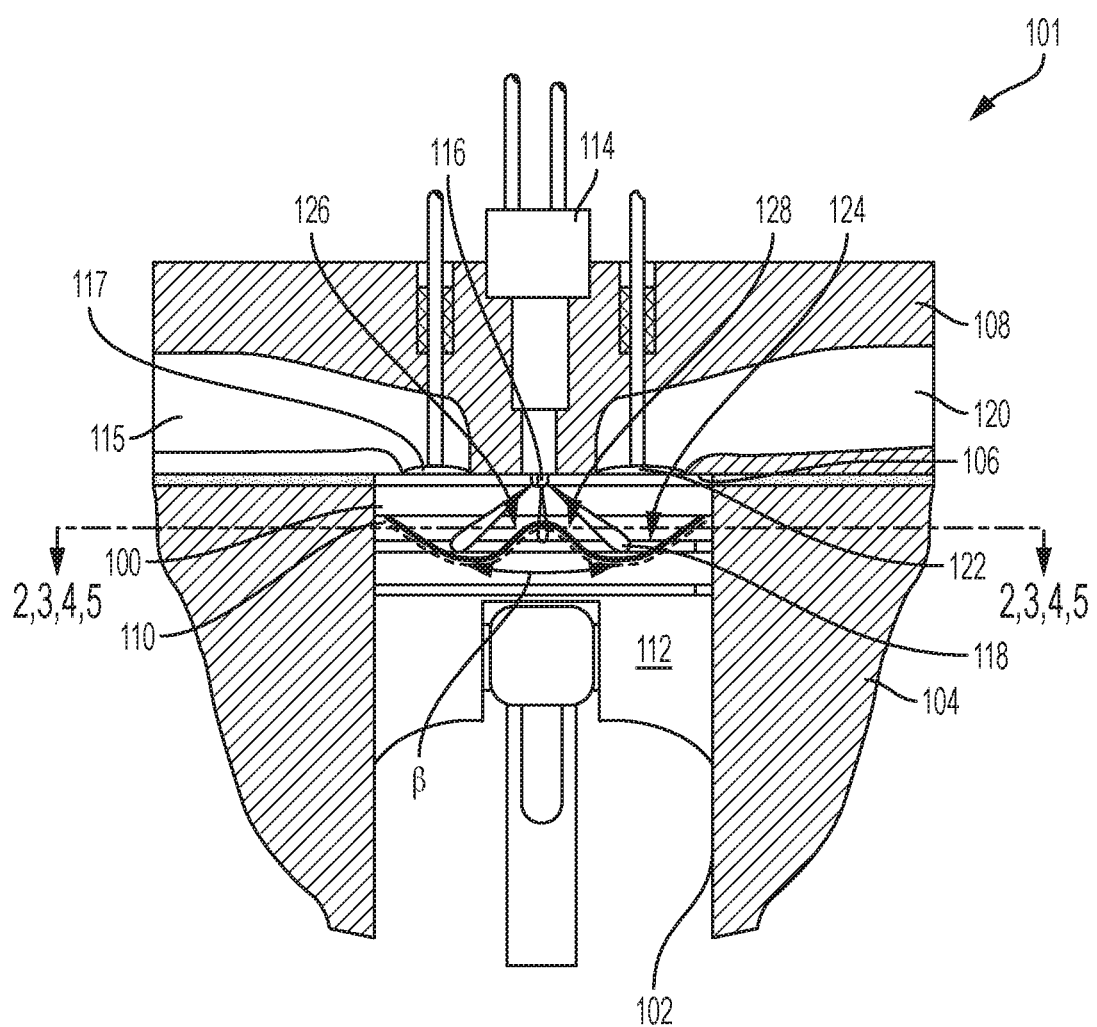
FIG. 1 is a cross section of an engine combustion chamber in accordance with the disclosure.

This disclosure relates to internal combustion engines and, more particularly, to features incorporated within at least one combustion chamber of the engine to redirect fuel jets provided by separate fuel injector nozzle openings towards a center portion of the combustion chamber, for example, towards a fuel injector, even for cylinders in which incoming air may include swirl. In the present disclosure, the term "jets" or "fuel jets" describes reacting (i.e. burning) or non-reacting streams of fuel, alone or in mixture with air, that is provided into an engine cylinder. These fuel jets may therefore comprise fuel droplets dispersed in air, or a flame once the fuel begins to oxidize with the surrounding air. In accordance with the disclosure, the fuel jets are redirected and also segregated during a majority of the injection time and/or burn time to promote better fuel/air mixing and a more uniform fuel/air mixture within the combustion chamber as compared to previously proposed or known combustion systems.

The various exemplary embodiments described herein include structures and features that operate or result in redirecting fuel jets radially with respect to the cylinder bore of an engine, to thus minimize or, at least, delay interaction between adjacent fuel jets entering the combustion chamber. The type of fuel being provided to the cylinder may be a spray of liquid fuel such as diesel or gasoline, or a jet of gaseous fuel such as natural or petroleum gas. The design is configured to impart an asymmetric effect to a combined air and fuel moving mass of fluids, which initially have a swirling aggregate velocity vector and which are redirected to have an aggregate radial velocity vector towards a center of the piston bore.

Stated differently, air entering into the cylinder may have swirl, i.e., radial and primarily tangential velocity components of each air particle. As fuel is injected into the chamber, it mixes with the air. The fuel particles or droplets have generally a radial velocity component such that, when the fuel droplets mix and evaporate into the swirling air, the tangential velocity component of the resulting mixtures is reduced, but not eliminated. The remaining tangential velocity component is countered by uneven or asymmetrical surfaces presented on protrusions on the piston, which impart a counter-swirl tangential velocity component to the fuel/air mixture that impinges on and is affected by the protrusion surfaces. The counter-swirl tangential velocity component of the fuel/air mixture thus cancels or eliminates the original tangential velocity of the swirling air mass, such that the resulting fuel/air mixture possesses a radially inward velocity component. In this way, a burning air/fuel mixture is directed inwardly relative to the piston, where additional oxygen to support the burning fuel is available. The disclosed embodiments can be tailored to counter many different particular swirling patterns that may exist in engine cylinders, and essentially transform a swirling combustion system into a quiescent combustion system. Some of the benefits of such a combustion system include reduced heat rejection, in that the flame is guided towards the center of the cylinder and away from the metal structures of the engine that surround and define the cylinder, which in turn leads to lower component temperatures, increased fuel efficiency, and a more uniform fuel/air mixture, which also leads to lower engine emissions.

A cross section of a combustion chamber 100 of an engine 101 in accordance with the disclosure is shown in FIG. 1. The combustion chamber 100 has a generally cylindrical shape that is defined within a cylinder bore 102 formed within a crankcase or engine block 104 of the engine. The combustion chamber 100 is further defined at one end by a flame deck surface 106 of a cylinder head 108, and at another end by a piston crown 110 of a piston 112 that is reciprocally disposed within the cylinder bore 102. A fuel injector 114 is mounted in the cylinder head 108. The fuel injector 114 has a tip 116 that protrudes within the combustion chamber 100 through the flame deck surface 106 such that it can directly inject fuel into the combustion chamber 100.

During operation of the engine 101, air is admitted into the combustion chamber 100 via an air inlet passage 115 when one or more intake valves 117 (one shown) are open during an intake stroke. As is the case in most engines, an incoming airflow into the combustion chamber 100 through the one or more intake valves 117 will be highly turbulent and possess swirling portions around one or more axes, which are imparted into the air flow by the various bends and corners in the air inlet passage 115 and other structures such as air passing over and around the intake valve 117. In a known configuration, high pressure fuel is permitted to flow through a plurality of nozzle openings in the tip 116. Each nozzle opening creates a fuel jet 118 that generally disperses to create a fuel/air mixture, which in a compression ignition engine auto-ignites and combusts. The fuel jets 118 may be provided from the injector at an included angle, β, of between 110 and 150 degrees, but other angles may also be used. The fuel jets 118 enter the combustion chamber 100 in a generally radially outward direction as the fuel travels through the injector openings. Following combustion, exhaust gas is expelled from the combustion chamber through an exhaust conduit 120 when one or more exhaust valves 122 (one shown) is/are open during an exhaust stroke.

The uniformity and extent of fuel/air mixing in the combustion cylinder is relevant to the combustion efficiency as well as to the amount and type of combustion byproducts that are formed. For example, fuel-rich mixtures, which may be locally present within the combustion chamber 100 during a combustion event due to insufficient mixing, or insufficient air available locally around those areas, may lead to higher soot emissions and lower combustion efficiency. In the illustrated embodiments, improved fuel/air combustion is managed for each fuel jet by forming a plurality of protrusions, which asymmetrically funnel or guide flames created when streams of air and fuel in the cylinder burn. The direction of flame propagation after the flames have been redirected by interaction with features in the piston bowl is such that at least a portion of the flames is directed to counter a swirl present in the cylinder. The net effect of the directed flames and swirling air is a direction of the flames towards the center of the piston, where air is available to achieve an air/fuel mixture having a desired air/fuel ratio. Each protrusion has two sides, a first side that has a generally concave shape and a normal vector that faces towards or against a swirling direction, and a second side that has a generally flat and/or convex shape and a normal vector that faces with or in the same direction as the swirling direction of air in the combustion chamber 100. In this way, each protrusion serves, accept, redirect and segregate therein on either side a portion of each of two adjacent fuel jets originating from the plurality of nozzle openings in the fuel injector, and redirect them towards the center of the combustion chamber 100.

Figure 2:
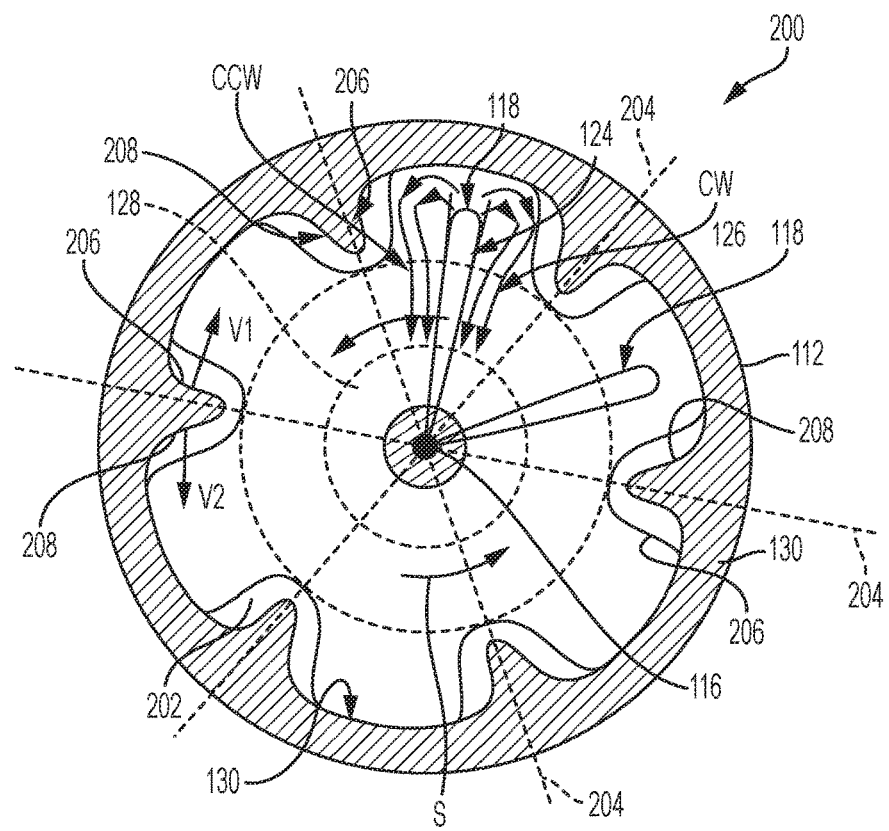
FIG. 2 is a top view in cross section of an engine piston in accordance with a first embodiment of the disclosure.

A first exemplary embodiment of the piston 112 is shown in FIG. 2. In the illustration of FIG. 2, only a top surface 200 of the piston crown 110 of the piston 112 is shown in cross section from a top perspective for illustration. The piston 112 includes a bowl 124 formed in the piston crown 110 that includes a central, raised conical protrusion 126 at the center of a conical, convex surface 128. The bowl 124 has a generally circular periphery and is defined within a circular crown wall 130. Included in the top surface 200 is a plurality of protrusions 202, which are disposed within the bowl 124 and along a periphery of the bowl 124 adjacent the wall 130.

Six protrusions 202 are shown herein, but it should be appreciated that any number of protrusions can be used depending on the number of nozzle openings in the tip 116 of the injector. The protrusions in the top surface 200 are arranged at regular intervals along equally distributed radial axes 204. Each axis 204 is disposed at exactly the same angle between the spray directions of adjacent nozzle tip openings of the fuel injector 114 such that a fuel jet 118 will emanate from the tip 116 in a radial direction between two adjacent axes 204, as shown.

In the schematic embodiment shown in FIG. 2, the development of two adjacent fuel jets 118 is shown at different instances in time. The lower, not fully developed jet to the right of the figure is shown at an instant when the fuel jet 118 has been emanated from the tip 116 but has not yet reached the wall 130. During this, initial time in an injection, the air in the cylinder and, thus, in and above the bowl 124, may have a generally circular or spiral momentum in a counterclockwise direction indicated by the block arrows "S." While the fuel jet 118 is travelling through a moving region of air, the speed of the air, which may include a tangential velocity vector because if the swirling momentum may not affect the radial travel direction of the fuel jet 118, at least initially. However, at a later instant, as shown by the fuel jet 118 shown counterclockwise and to the left of the original jet, towards the top of the figure, the fuel jet or flame 118 may impinge against the wall 130 and separate into two tangential jets, each tangential jet heading towards the two adjacent protrusions 202 that flank the impingement site.

As can be seen in FIG. 2, the protrusions 202 present different profiles or shapes to asymmetrically guide the tangential jets that impinge thereon. For illustration, each protrusion 202 includes a first side face 206, which faces in a direction against the swirl S, and a second side face 208, which faces in a direction with the swirl S. In the nomenclature used herein, a direction in which each side face of the protrusion "faces" means the direction in which a normal vector that is generally perpendicular to the respective side face and point away from the surface in an outward direction with respect to the protrusion is pointing. Two such vectors, V1 and V2, are shown on one of the protrusions 202 on the left side of the figure for illustration. In various embodiments, the first and second side faces of the protrusions may be different from one piston to another, but they all will share a similar trend, which is that the first side face 206 of each protrusion 202, i.e., on the side that faces against the swirling direction S, will be generally concave such that a larger turning effect is provided to fluids impinging and being redirected by the first side face 206 to counteract the swirl that is present in the swirling direction S; the same trend also includes that the second side face 208 of each protrusion 202, i.e., on the side that faces away from the swirling direction S, will be generally flat or convex such that a lesser turning effect is provided to fluids impinging and being redirected by the second side face 208, because those fluids are already turning in the opposite direction as the swirling direction S.

As can be seen from FIG. 2, when the fuel jet 118 impinges onto the wall 130, it separates into many substreams that include two tangential streams that follow the curvature of the wall 130 until they meet the protrusions 202 that flank the area onto which particular fuel jet 118 impinges along the wall 130. These two tangential jets can be referred to as the clockwise (CW) subjet, i.e. the subjet that turns in a location that is located in a clockwise direction relative to the particular fuel jet 118, and the counter-clockwise (CCW) subjet, i.e. the subjet that turns in a location that is located in a counter-clockwise direction relative to the particular fuel jet 118. For a more complete burn in the combustion chamber 100, it is desired to have both the CW and CCW fuel subjets advance in a radial direction towards the center of the combustion cylinder. The different shapes of the first and second side faces 206 and 208 can accomplish this taking under consideration the swirl S in the cylinder. Thus, the CW subjet in the embodiment shown makes a shallow turn off the second side face 208, because it will be carried along the swirl S as it advances towards the tip 116. For the same reason, the CCW subjet makes a sharper turn off the first side face 206, because its course will also be adjusted as it advances against the swirl S.

Figure 3:
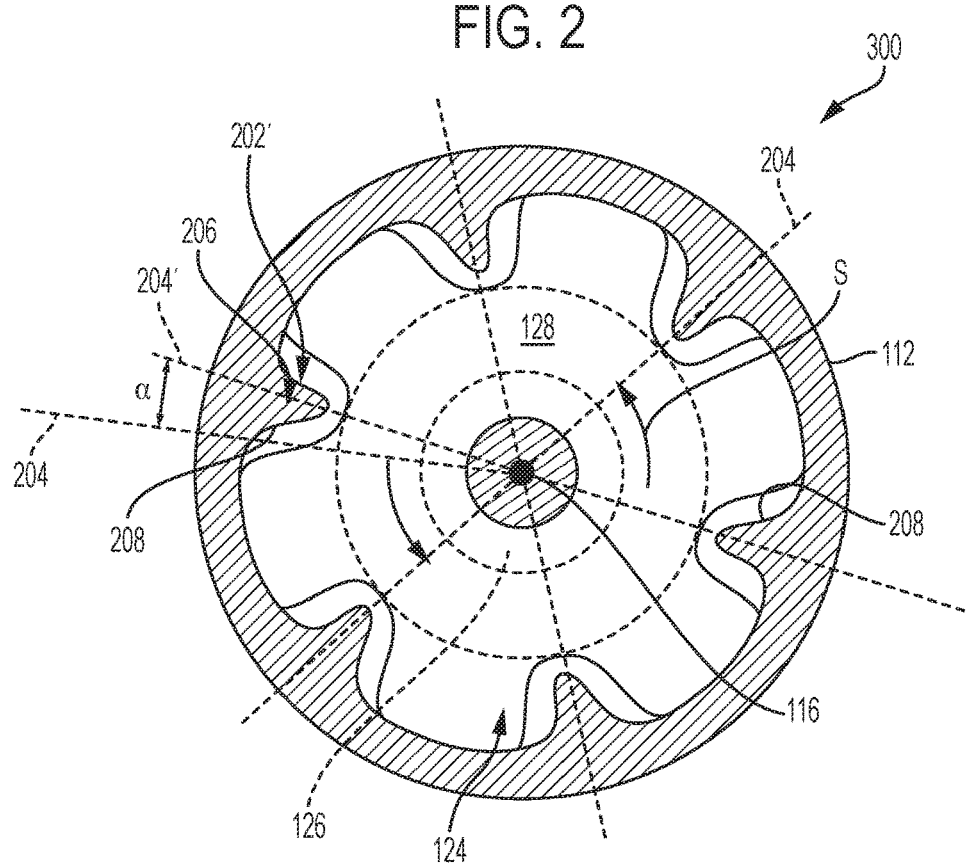
FIG. 3 is a top view in cross section of an engine piston in accordance with a second embodiment of the disclosure.

An alternative or second exemplary embodiment for the piston 112 is shown in FIG. 3. In the illustration of FIG. 3, features and structures that are the same or similar to corresponding features and structures of the embodiment shown in FIG. 2 are denoted with the same reference numbers for simplicity. In the embodiment of FIG. 3, only a top surface 300 of the piston crown 110 of the piston 112 is shown in cross section from a top perspective for illustration. The piston 112 includes the bowl 124 having the conical protrusion 126 at the center of a surface 128, which can have a flat or, as shown in FIG. 1, a convex or conical profile. Included in the top surface 300 is a plurality of protrusions 202, which are disposed within the bowl 124 and along a periphery of the bowl 124 adjacent the wall 130. Six protrusions 202 are shown herein, but it should be appreciated that any number of protrusions can be used depending on the number of nozzle openings in the tip 116 of the fuel injector 114.

Unlike the protrusions in the top surface 200 (FIG. 2), the protrusions 202 in the top surface 300 are disposed at irregular intervals, for example, at an angle relative to the equally distributed radial axes 204. At least one protrusion 202' is shown on the top left side of the surface 300 being formed at a clockwise rotated position relative to the nearest axis 204, but it should be appreciated that more than one, or the entire plurality of protrusions way be positioned in this fashion. Such placement of one or more of the plurality of protrusions 202 may enhance the effect of counter-swirling flow momentum provided to developing flames within the cylinder when the protrusions are clocked in a direction opposite or into the swirl direction S. To lessen the counter-swirling effect, the protrusions may be clocked in the same direction as the swirl direction, which in this embodiment would have them located in a counter-clockwise direction relative to the axes 204 by an angle, a. The increase or lessening of the counter-swirl effect may be used to address localized swirling action within the cylinder, for example, when air enters at a sharp angle into the cylinder.

Figure 4:
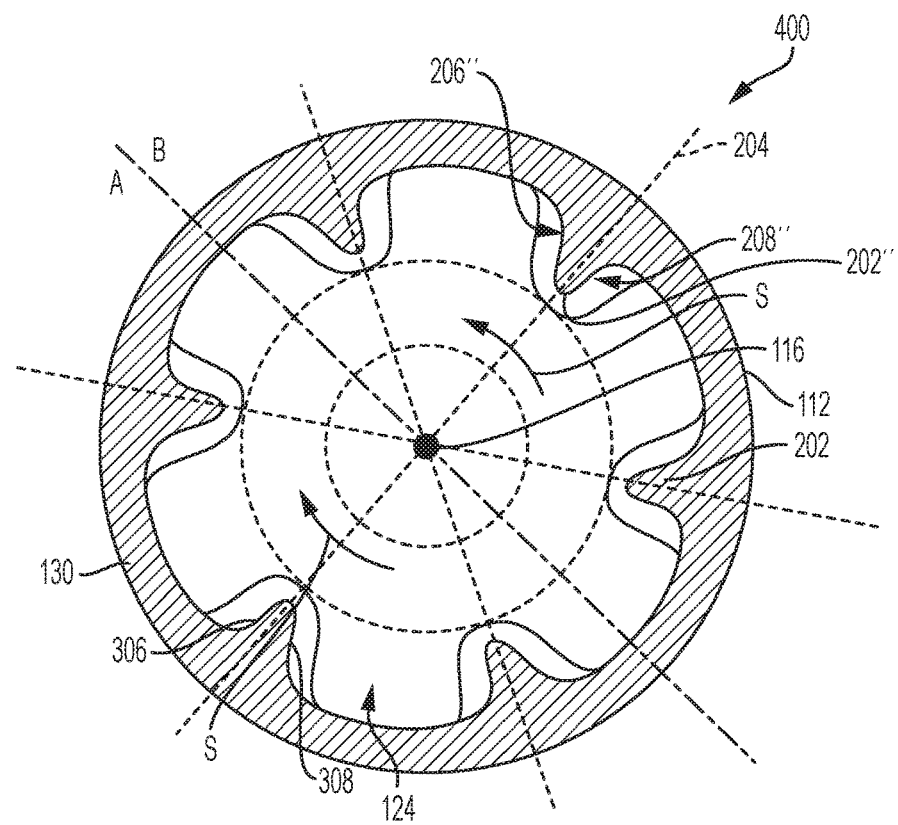
FIG. 4 is a top view in cross section of an engine piston in accordance with a third embodiment of the disclosure.

Another alternative or third exemplary embodiment for the piston 112 is shown in FIG. 4. In the illustration of FIG. 4, features and structures that are the same or similar to corresponding features and structures of the embodiment shown in FIG. 2 are denoted with the same reference numbers for simplicity. In the embodiment of FIG. 4, only a top surface 400 of the piston crown 110 of the piston 112 is shown in cross section from a top perspective for illustration. As in the previous embodiments, the piston 112 includes the bowl 124 having the conical protrusion 126 at the center of a conical, convex surface 128. Included in the top surface 400 is a plurality of protrusions 202, which are disposed within the bowl 124 and along a periphery of the bowl 124 adjacent the wall 130. Six protrusions 202 are shown herein, but it should be appreciated that any number of protrusions can be used depending on the number of nozzle openings in the tip 116 of the fuel injector 114.

Unlike the protrusions in the top surface 200 (FIG. 2) or 300 (FIG. 3), at least one of the protrusions 202" in the top surface 400 is proportionally larger than the remaining protrusions in the plurality of protrusions. The at least one larger protrusion 202" is shown on the top right side of the surface 400 and being formed at a clockwise rotated position relative to the nearest axis 204, but it should be appreciated that more than one, or the entire plurality of protrusions may be implemented in this fashion. In addition, the top surface 400 includes protrusions oriented in opposite directions along two halves of the piston, as shown, as sides "A" and "B". This may be because of different swirls that are created in the cylinder, at least temporarily, before the entire intake charge mass settles into a net swirl within the cylinder. The transient swirls are denoted by the arrows S, where two opposite rotations are created, for example, in cylinders having two intake valves that receive air with different rotational characteristics. Thus, while surfaces 206" face the swirl on the B side of the piston, surfaces 306 may face an opposite swirl A on the A side of the piston to guide developing flames towards the center of the cylinder, especially in engines where late intake valve closing may not allow sufficient time for a net swirl to settle into the cylinder.

Figure 5:
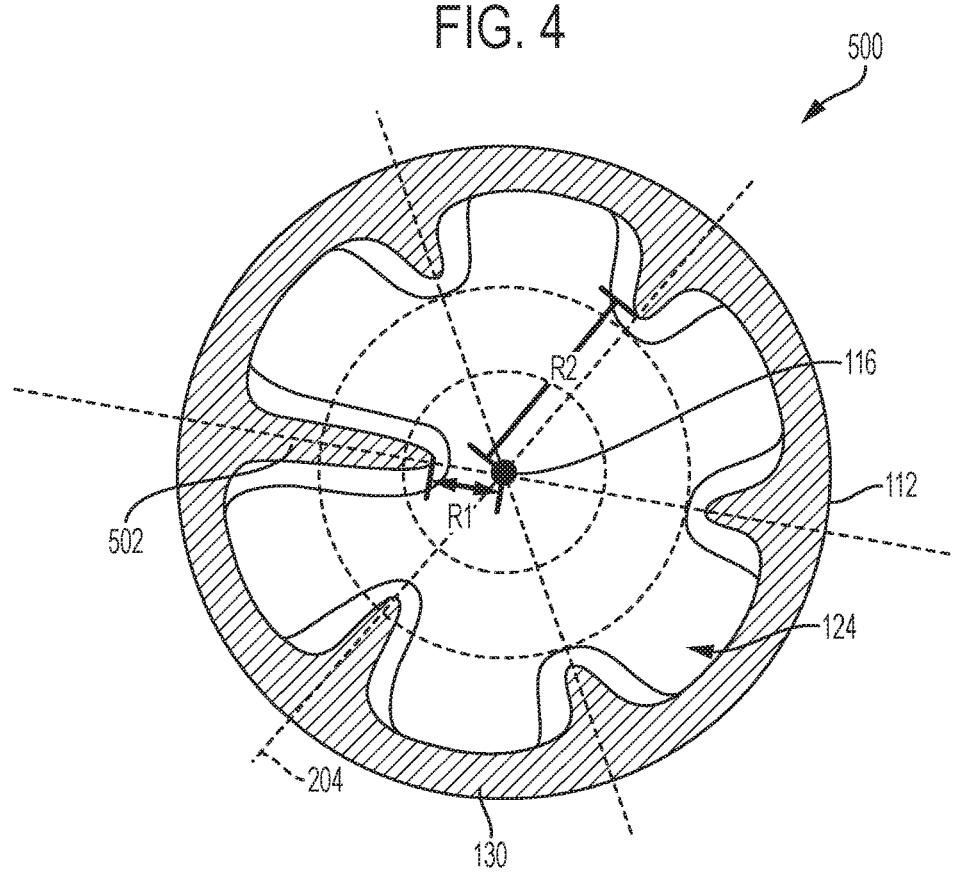
FIG. 5 is a top view in cross section of an engine piston in accordance with a fourth embodiment of the disclosure.

Another alternative or fourth exemplary embodiment for the piston 112 is shown in FIG. 5. In the illustration of FIG. 5, features and structures that are the same or similar to corresponding features and structures of the embodiment shown in FIG. 2 are denoted with the same reference numbers for simplicity. In the embodiment of FIG. 5, only a top surface 500 of the piston crown 110 of the piston 112 is shown in cross section from a top perspective for illustration. As in the previous embodiments, the piston 112 includes the bowl 124 having the conical protrusion 126 at the center of a conical, convex surface 128. Included in the top surface 500 is a plurality of protrusions 502, which are disposed within the bowl 124 and along a periphery of the bowl 124 adjacent the wall 130 at regular intervals that coincide with the axes 204. Six protrusions 202 are shown herein, but it should be appreciated that any number of protrusions can be used depending on the number of nozzle openings in the tip 116 of the fuel injector 114.

Unlike the protrusions in the top surface 200 (FIG. 2), at least one of the protrusions 502 in the top surface 500 is proportionally longer in a radial direction than the remaining protrusions in the plurality of protrusions in that it extends radially up to a radial distance R1 from a center of the piston, which is smaller than a radial distance R2 of another protrusion in the plurality of protrusions. In the illustrated embodiment, three different protrusion lengths are used in the piston. The at least one longer protrusion 502 is shown on the top left side of the surface 500, but it should be appreciated that more than one protrusion way be formed in this fashion. The longer protrusions may be used when localized swirling patterns inside the cylinder are located close to the center portion of the cylinder.

INDUSTRIAL APPLICABILITY

The present disclosure is not only applicable to internal combustion engines having reciprocating pistons, as described relative to the embodiments illustrated herein, but also to other types of applications, such as gas turbines, industrial burners and the like. In general the various asymmetrical protrusions can be formed in a structure that the fuel jet will impinge upon when injected by an injector into a combustion chamber. The protrusions arcuate indents and the redirection and segregation of fuel jets and plumes they provide are effective in promoting faster combustion and redirection of developing flames towards more oxygen-rich areas at the center of the cylinder.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

I claim:

1. An internal combustion engine, comprising:
    an engine block having a cylinder bore;
    a cylinder head having a flame deck surface disposed at one end of the cylinder bore;
    an air intake valve associated with the cylinder head and configured to open and allow a flow of air into the cylinder bore;
    a piston connected to a rotatable crankshaft and configured to reciprocate within the cylinder bore along a longitudinal direction, the piston having a crown portion facing the flame deck surface such that a combustion chamber is defined within the cylinder bore and between a top surface of the crown portion and the flame deck surface, the crown portion including a piston bowl having a concave shape and extending within the crown portion and a wall, the wall extending peripherally around the piston along a circumferential direction;
    a fuel injector having a nozzle tip disposed in fluid communication with the combustion chamber, the nozzle tip having a plurality of nozzle openings configured to inject a plurality of fuel jets into the combustion chamber, each fuel jet of the plurality of fuel jets being provided along a respective fuel jet centerline; and
    a plurality of protrusions disposed in the piston bowl adjacent to the wall, each protrusion of the plurality of protrusions including
        an apex,
        a first side surface extending from the wall to the apex, and
        a second side surface extending from the wall to the apex, the second side surface facing away from the first side surface along the circumferential direction, the apex being disposed closer to a center of the combustion chamber than the wall along a radial direction, the radial direction being perpendicular to the longitudinal direction,
        the first side surface having a concave shape in a reference plane, the second side surface having a flat or convex shape in the reference plane, the reference plane being defined exclusively by the radial direction and the circumferential direction, the reference plane being perpendicular to the longitudinal direction, wherein, during operation, a swirling air mass provided into the combustion chamber through the air intake valve interacts with the plurality of protrusions and the plurality of fuel jets, such that a net effect of the interaction results in directing a flame toward a center of the combustion chamber.

2. The internal combustion engine of claim 1, wherein a number of nozzle openings in the plurality of nozzle openings matches a number of protrusions in the plurality of protrusions.

3. The internal combustion engine of claim 2, wherein each protrusion of the plurality of protrusions is arranged at uniform intervals about the circumferential direction,
 each protrusion being located along a radial axis of a plurality of radial axes, each radial axis being arranged at uniform intervals about the circumferential direction, and
 a spray axis of each nozzle opening of the plurality of nozzle openings being disposed between radial axes of adjacent protrusions of the plurality of protrusions about the circumferential direction.

4. The internal combustion engine of claim 3, wherein each fuel jet is adapted to impinge against the wall at an impingement site and separate into two tangential jets within the piston bowl, each tangential jet heading toward two adjacent protrusions of the plurality of protrusions that flank the impingement site.

5. The internal combustion engine of claim 1, wherein at least one protrusion of the plurality of protrusions is disposed at an irregular interval around the piston bowl about the circumferential direction by an angle, $\alpha$.

6. The internal combustion engine of claim 1, wherein at least one protrusion of the plurality of protrusions is longer along the radial direction than remaining protrusions in the plurality of protrusions.

7. The internal combustion engine of claim 6, wherein subsets of protrusions in the plurality of protrusions extend by different radial distances toward the center of the combustion chamber.

8. A piston for an internal combustion engine, the piston comprising:
 a piston body;
 a crown portion extending below a top surface of the piston body along a longitudinal direction, the crown portion including a bowl having a concave shape and extending within the crown portion and a wall, the wall extending peripherally around the piston body along a circumferential direction; and
 a plurality of protrusions disposed in the bowl adjacent to the wall, each protrusion of the plurality of protrusions including
  an apex,
  a first side surface extending from the wall to the apex, and
  a second side surface extending from the wall to the apex, the second side surface facing away from the first side surface along the circumferential direction, the apex being disposed closer to a center of the bowl than the wall along a radial direction, the radial direction being perpendicular to the longitudinal direction,
 the first side surface having a concave shape in a reference plane, the second side surface having a flat or convex shape in the reference plane, the reference plane being defined exclusively by the radial direction and the circumferential direction, the reference plane being perpendicular to the longitudinal direction.

9. The piston of claim 8, wherein a number of protrusions in the plurality of protrusions matches a number of injection orifices of a fuel injector disposed in an engine in which the piston operates.

10. The piston of claim 8, wherein each protrusion of the plurality of protrusions is arranged at uniform intervals about the circumferential direction,
 each protrusion is located along a radial axis of a plurality of radial axes, and
 each radial axis is arranged at uniform angular spacing relative to an adjacent radial axis about the circumferential direction.

11. The piston of claim 8, wherein at least one protrusion of the plurality of protrusions is disposed at an irregular interval around the bowl about the circumferential direction by an angle, $\alpha$.

12. The piston of claim 8, wherein at least one protrusion of the plurality of protrusions is larger than remaining protrusions in the plurality of protrusions.

13. The piston of claim 8, wherein at least one protrusion of the plurality of protrusions is longer in the radial direction than remaining protrusions in the plurality of protrusions.

14. The piston of claim 13, wherein subsets of protrusions in the plurality of protrusions extend by different radial distances from the wall toward a center of the piston body.

15. The piston of claim 8, wherein the bowl includes a central, raised conical protrusion at a center of a conical, convex surface.

* * * * *